(12) United States Patent
Hu et al.

(10) Patent No.: US 12,557,528 B2
(45) Date of Patent: Feb. 17, 2026

(54) DISPLAY PANEL, METHOD FOR MANUFACTURING SAME, AND DISPLAY DEVICE

(71) Applicants: CHENGDU BOE OPTOELECTRONICS TECHNOLOGY CO., LTD., Chengdu Sichuan (CN); BOE TECHNOLOGY GROUP CO., LTD., Beijing (CN)

(72) Inventors: Hongjin Hu, Beijing (CN); Chang Wang, Beijing (CN); Jiaxiang Zhang, Beijing (CN); Liangliang Ju, Beijing (CN); Mingqiang Wang, Beijing (CN); Chaoqun Zhu, Beijing (CN); Xin Li, Beijing (CN); Kun Zuo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 856 days.

(21) Appl. No.: 17/796,117

(22) PCT Filed: Aug. 27, 2021

(86) PCT No.: PCT/CN2021/115116
§ 371 (c)(1),
(2) Date: Jul. 28, 2022

(87) PCT Pub. No.: WO2023/024097
PCT Pub. Date: Mar. 2, 2023

(65) Prior Publication Data
US 2024/0188387 A1    Jun. 6, 2024

(51) Int. Cl.
*H10K 59/80* (2023.01)
*G06F 3/041* (2006.01)
(Continued)

(52) U.S. Cl.
CPC ......... *H10K 59/873* (2023.02); *G06F 3/0412* (2013.01); *G06F 3/04164* (2019.05);
(Continued)

(58) Field of Classification Search
CPC .......... G06F 2203/04103; G06F 3/041; G06F 3/0412; G06F 3/04164; G06F 3/044;
(Continued)

(56) References Cited

U.S. PATENT DOCUMENTS

2020/0218399 A1* 7/2020 Maeng .................. G06F 3/0443

FOREIGN PATENT DOCUMENTS

| CN | 105892755 A | 8/2016 |
| CN | 110597420 A | 12/2019 |

(Continued)

*Primary Examiner* — Robin J Mishler
(74) *Attorney, Agent, or Firm* — Lippes Mathias LLP

(57) ABSTRACT

Provided is a display panel including: a display substrate, including a display region, a bonding region, and a spacing region disposed between the display region and the bonding region; a touch layer, disposed on a surface of the display substrate and contiguously arranged in the display region, the spacing region, and at least part of the bonding region; a polarizer layer, disposed on a side, distal from the display substrate, of the touch layer and arranged in the display region; a flexible circuit board, connected to the touch layer in the bonding region, wherein the flexible circuit board and the polarizer layer are disposed on one surface of the touch layer; and a protective structure, covering the touch layer in the spacing region.

17 Claims, 12 Drawing Sheets

(51) Int. Cl.
*H10K 59/40* (2023.01)
*H10K 59/90* (2023.01)
*H10K 71/50* (2023.01)

(52) U.S. Cl.
CPC ............. *H10K 59/40* (2023.02); *H10K 59/90* (2023.02); *G06F 2203/04103* (2013.01); *H10K 71/50* (2023.02)

(58) Field of Classification Search
CPC .... H10K 59/131; H10K 59/40; H10K 59/873; H10K 59/90; H10K 71/50
See application file for complete search history.

(56) References Cited

FOREIGN PATENT DOCUMENTS

| | | |
|---|---|---|
| CN | 111399706 A | 7/2020 |
| JP | 2010198336 A | 9/2010 |
| KR | 20170112792 A | 10/2017 |

* cited by examiner

… (1) …

DISPLAY PANEL, METHOD FOR MANUFACTURING SAME, AND DISPLAY DEVICE

CROSS-REFERENCE TO RELATED APPLICATION

This application is a 371 of PCT/CN2021/115116, filed on Aug. 27, 2021, the disclosure of which is incorporated herein by reference in its entirety.

TECHNICAL FIELD

The present disclosure relates to the field of display technology and, in particular, relates to a display panel, a method for manufacturing the same, and a display device.

BACKGROUND

A touch panel is a panel that integrates a touch control function and a display function. A touch panel includes a touch screen, a polarizer layer attached to a surface of the touch screen, and a touch flexible printed circuit board bonded to the surface of the touch screen, and the flexible printed circuit board and the polarizer layer are arranged at intervals on the surface of the touch screen. The above touch panel structure is also referred to as a polarizer layer sensor touch structure.

SUMMARY

Embodiments of the present disclosure provide display panel, a method for manufacturing the same, and a display device. The technical solution is as follows.

In an aspect, a display panel is provided. The display panel includes: a display substrate, including a display region, a bonding region, and a spacing region disposed between the display region and the bonding region: a touch layer, disposed on a surface of the display substrate and contiguously arranged in the display region, the spacing region and at least part of the bonding region: a polarizer layer, disposed on a side, distal from the display substrate, of the touch layer and arranged in the display region: a flexible circuit board, connected to the touch layer in the bonding region, wherein the flexible circuit board and the polarizer layer are disposed on one surface of the touch layer: and a protective structure, covering the touch layer in the spacing region.

Optionally, the display panel further includes: an adhesive layer, disposed between the polarizer layer and the touch layer, wherein the protective structure includes an adhesive structure, the adhesive structure being integrally formed with the adhesive layer: and a covering structure, covering the touch layer in the spacing region not covered by the adhesive structure.

Optionally, the display panel further includes: a conductive adhesive, disposed between the flexible circuit board and the touch layer and arranged in the bonding region: a filling layer, disposed on a side, distal from the display substrate, of the flexible circuit board in the bonding region: wherein the covering structure is integrally formed with at least one of the flexible circuit board, the conductive adhesive and the filling layer.

Optionally, the touch layer includes: a touch electrode, arranged in the display region: a pad, arranged in the bonding region and bonded to the flexible circuit board by the conductive adhesive: and a signal line, at least partially arranged in the spacing region to connect the touch electrode and the pad, wherein the signal line in the spacing region is covered by the protective structure.

Optionally, the conductive adhesive extends from the bonding region to the spacing region, and the covering structure is integrally formed with the conductive adhesive: and side edges of the conductive adhesive are in contact with side edges of the adhesive structure in the spacing region, or a portion of the conductive adhesive is stacked on the adhesive structure.

Optionally, a width of an overlapped portion between the conductive adhesive and the adhesive structure in a first direction ranges from 50 nm to 100 nm: wherein the first direction is an arrangement direction of the display region, the spacing region and the bonding region.

Optionally, the flexible circuit board includes a metal layer and an insulating film layer disposed between the metal layer and the filling layer: wherein the metal layer is bonded to the pad of the touch layer in the bonding region, the insulating film layer extends from the bonding region to the spacing region, the covering structure is integrally formed with the insulating film layer, and a portion of the insulating film layer is stacked on the adhesive structure.

Optionally, a width of an overlapped portion between the insulating film layer and the adhesive structure in a first direction ranges from 50 nm to 100 nm: wherein the first direction is an arrangement direction of the display region, the spacing region and the bonding region.

Optionally, a spacing between the metal layer and the adhesive structure in the first direction ranges from 50 nm to 100 nm.

Optionally, the filling layer extends from the bonding region to the spacing region, the covering structure is integrally formed with the filling layer, and a portion of the filling layer is stacked on the adhesive structure.

Optionally, a width of an overlapped portion between the filling layer and the adhesive structure in a first direction ranges from 50 nm to 100 nm: wherein the first direction is an arrangement direction of the display region, the spacing region and the bonding region.

In another aspect, a display device is provided. The display device includes a power supply assembly, wherein the display panel is the display panel as described in any one of the above aspect, and the power supply assembly is configured to supply power to the display panel.

In still another aspect, a method for manufacturing a display panel is provided. The method includes: providing a display substrate, wherein the display substrate includes a display region, a bonding region, and a spacing region disposed between the display region and the bonding region: forming a touch layer on a surface of the display substrate, wherein the touch layer is contiguously arranged in the display region, the spacing region, and at least part of the bonding region: forming a polarizer layer on a side, distal from the display substrate, of the touch layer of the display region and forming a flexible circuit board on the touch layer in the bonding region: and forming a protective structure covering the touch layer of the spacing region in the spacing region.

Optionally, the protective structure including an adhesive structure and a covering structure, and forming the protective structure covering the touch layer of the spacing region in the spacing region includes: forming an integrally formed adhesive layer and adhesive structure on the touch layer prior to forming the polarizer layer: and forming a covering structure on the touch layer not covered by the adhesive structure in the spacing region.

Optionally, forming the covering structure on the touch layer not covered by the adhesive structure in the spacing region includes: forming a conductive adhesive layer on the touch layer in the bonding region prior to forming the flexible circuit board: forming a filling layer on the flexible circuit board in the bonding region upon forming the flexible circuit board: and forming a covering structure integrally formed with at least one of the flexible circuit board, the conductive adhesive and the filling layer in response to forming at least one layer of the flexible circuit board, the conductive adhesive and the filling layer.

BRIEF DESCRIPTION OF THE DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

For clearer descriptions of the objectives, technical solutions, and advantages of the present disclosure, the following further describes implementations of the present disclosure in detail with reference to the accompanying drawings.

Figure 1:
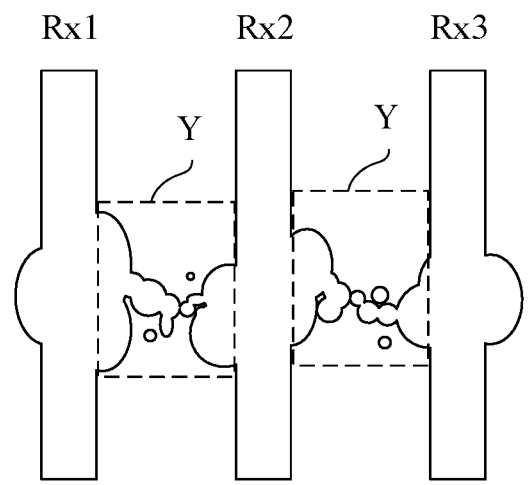
FIG. 1 is a schematic diagram of a structure of signal lines corroded in the related art.

In related art, because of process limitations, a part of signal lines of the touch layer of the touch screen is exposed after the touch screen and flexible circuit board are bonded. Signal lines are generally metal signal lines, such as copper signal lines. The polarizer layer contains iodine, which is precipitated by water in environmental reliability tests, such as high temperature and high humidity (85° ° C. temperature. 85% humidity) state, and causes corrosion of the exposed copper signal line with water vapor, which can easily lead to a short circuit. FIG. 1 is a schematic diagram of a structure of signal lines corroded in the related art. Referring to FIG. 1, three adjacent signal lines Rx1, Rx2 and Rx3 are corroded and the corrosive substance Y is scattered to the region between adjacent signal lines (e.g., Rx1 and Rx2), causing adjacent signal lines (e.g., Rx1 and Rx2) to lap, thus making the signal lines of the touch layer short-circuit. It should be noted that the polarizer layer contains iodine, which also precipitates under normal conditions and causes corrosion of the signal lines with a slower rate.

Figure 2:
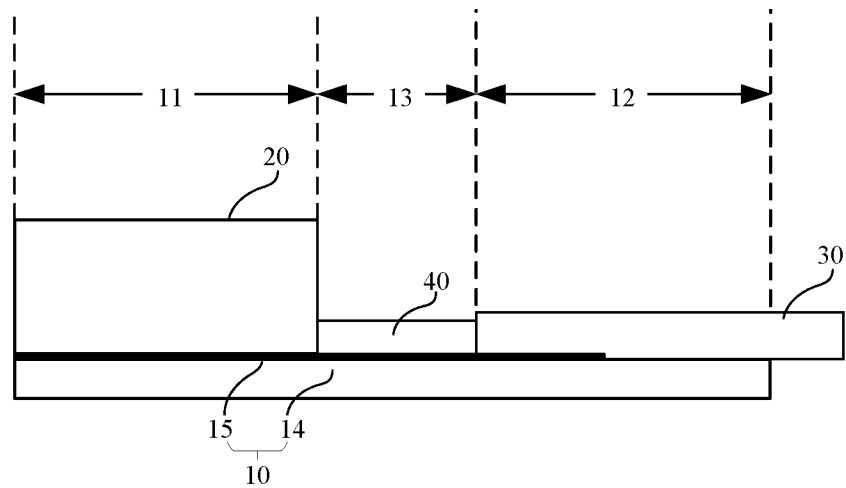
FIG. 2 is a schematic diagram of a structure of a display panel according to some embodiments of the present disclosure.
Figure 3:
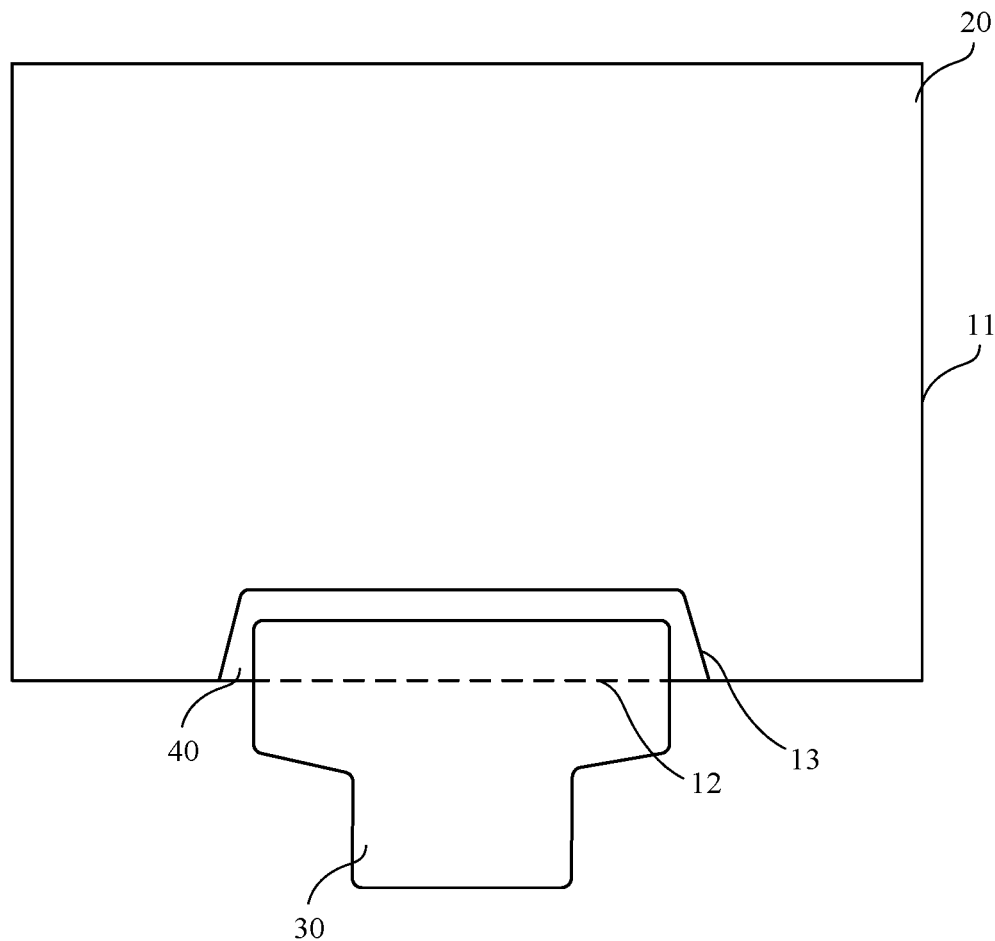
FIG. 3 is a top view of a display panel according to some embodiments of the present disclosure.

FIG. 2 is a display panel according to some embodiments of the present disclosure. The display panel includes a display substrate 14, a touch layer 15, a polarizer layer 20, a flexible circuit board 30, and a protective structure 40. FIG. 3 is a top view of a display panel according to some embodiments of the present disclosure. Referring to FIG. 2 and FIG. 3, the display substrate 14 includes a display region 11, a bonding region 12, and a spacing region 13 disposed between the display region 11 and the bonding region 12.

The touch layer 15 is disposed on a surface of the display substrate 14 and is contiguously arranged in the display region 11, the spacing region 13 and at least part of the bonding region 12. The polarizer layer 20 is disposed on a side, distal from the display substrate 14, of the touch layer 15 of the display region 11, the flexible circuit board 30 is connected to the touch layer 15 in the bonding region 12 and the flexible circuit board 30 and the polarizer layer 20 are disposed on one surface of the touch layer 15, and the protective structure 40 covers the touch layer 15 in the spacing region 13.

The flexible circuit board 30 and the polarizer layer 20 are disposed on one surface of the touch layer 15, which includes that the flexible circuit board 30 and the polarizer layer 20 are in direct contact with the surface of the touch layer 15 and the flexible circuit board 30 and the polarizer layer 20 are in indirect contact with the surface of the touch layer 15.

It should be noted that the protective structure 40 covering the touch layer 15 in the spacing region 13 does not need to completely cover the entire spacing region 13, but it is sufficient to cover a metal portion of the touch layer 15 in the spacing region 13.

Typically, the polarizer layer is formed on a whole surface of the display substrate 14. But in order to form the flexible circuit board 30, an opening is disposed on the polarizer layer, and the opening corresponds to the spacing region 13 and bonding region 12, such that the spacing region 13 and bonding region 12 together can also be referred to as open cutting area, and spacing region 13 is also referred to as contact area.

The touch screen is typically a combination of a display substrate and a touch substrate, and the touch substrate may be an external touch substrate in embodiments of the present disclosure. The display substrate can be implemented by an organic light-emitting diode display substrate. The touch substrate includes the touch layer. That is, the display substrate 14 and the touch layer 15 constitute the touch screen 10.

The structure of attaching the polarizer layer to the external touch substrate in the embodiment of the present disclosure may also be referred to as a polarizer layer sensor touch structure.

The polarizer layer 20 is a sandwich structure consisting of two layers of triacetyl cellulose (TAC) and a layer of polyvinyl alcohol (PVA) disposed between the two layers. The PVA material contains a large amount of iodine that allow linearly polarized light in a single direction to pass through. The iodine in in the PVA material is precipitated by water at high temperature and high humidity (e.g., 8585 (85° C. temperature, 85% humidity) environmental reliability test). In the case that the iodine contacts with the touch layer metal of the touch substrate, such as copper metal, a redox reaction occurs and copper iodide is generated. In the spacing region, the structure of the touch layer is multiple interval signal lines, i.e., trace, the redox reaction is to lead to adjacent signal lines short circuit.

The flexible circuit board 30 refers to a flexible circuit board bonded to a touch substrate, also referred to as a touch flexible printed circuit board (TFPC).

In the embodiments of the present disclosure, the touch layer is covered in the display region by forming a polarizer laver, the touch layer is covered in the bonding region by forming a flexible circuit board, and the touch layer is covered in the spacing region by arranging a protective structure, such that the entire touch layer does not have an exposed portion, avoiding corrosion of the exposed touch layer by iodine and water vapor in the polarizer layer, solving the problem of short circuiting of signal lines in the touch layer, and improving the stability of the display panel.

Figure 4:
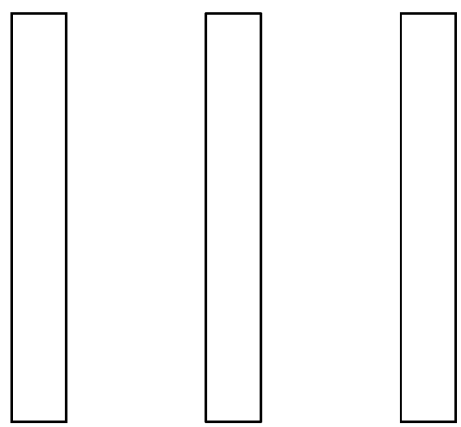
FIG. 4 is a schematic diagram of a structure of a signal line of a display panel upon an environmental reliability test according to some embodiments of the present disclosure.

The environmental reliability test is performed on the display panel provided by the embodiments of the present disclosure, and the short circuit caused by corrosion is significantly improved. FIG. 4 is a schematic diagram of the structure of the signal lines of the display panel upon the environmental reliability test according to embodiments of the present disclosure. Referring to FIG. 4, in the embodiments of the present disclosure, the signal lines (Rx1, Rx2, and Rx3) of the display panel are not corroded upon the environmental reliability test, and the adjacent signal lines (e.g., Rx1 and Rx2) remain insulated from each other, thereby avoiding the short circuit problem. Compared with the related technology shown in FIG. 1, the short circuit problem of signal lines in the touch layer is solved and the stability of the display panel is improved.

Figure 5:
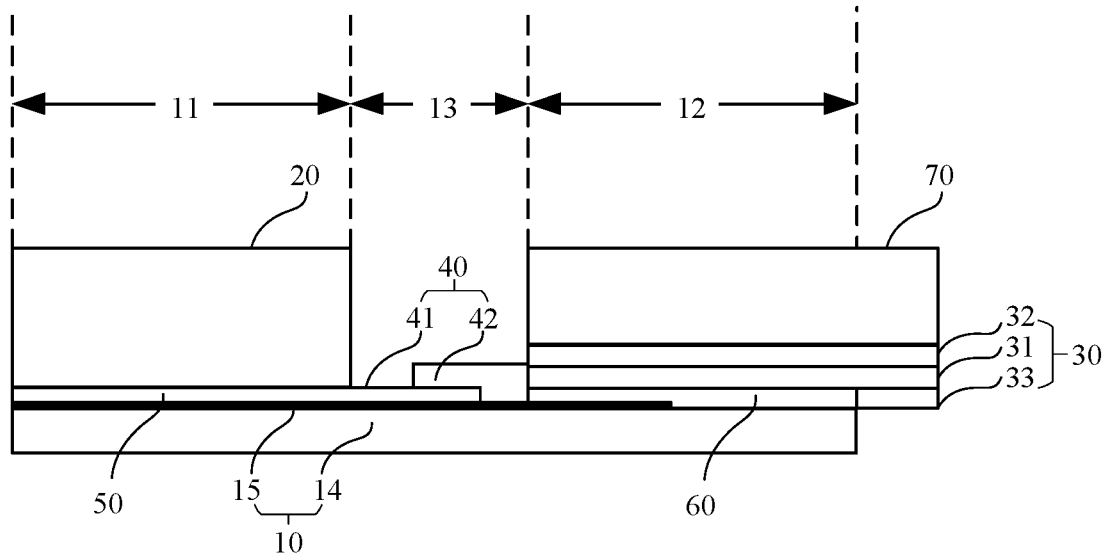
FIG. 5 is a schematic diagram of a structure of a display panel according to some embodiments of the present disclosure.

FIG. 5 is a schematic diagram of a structure of a display panel according to some embodiments of the present disclosure. Referring to FIG. 5, the display panel further includes an adhesive layer 50 disposed between the polarizer layer 20 and said touch layer 15.

The protective structure 40 includes an adhesive structure 41 and a covering structure 42.

The adhesive structure 41 is integrally formed with the adhesive layer 50. In the embodiments of the present disclosure, the adhesive structure 41 is a portion of the adhesive layer 50 that extends from the display region 11 to the spacing region 13 during manufacture.

The covering structure 42 covers the touch layer 15 in the spacing region 13 not covered by the adhesive structure 41.

In the embodiment of the present disclosure, a portion of the touch layer in the spacing region 13 is covered by the adhesive structure, and a gap exists between the adhesive structure and the flexible circuit board, and the touch layer in the gap is covered by the covering structure 42 to overcome the deficiency of the manufacturing process.

Exemplarily, the adhesive layer 50 is a thermoplastic-optical clear film (OCF) layer, which is a protective layer over the touch layer and bonds the touch screen and the polarizer laver.

Only a portion of the covering structure 42, i.e., the portion in the middle layer, is shown in FIG. 5. In practice, the overlay structure 42 can be realized by the flexible circuit board and its associated film layer to extend into the spacing region, or by forming a new layer on top of the flexible circuit board and its associated film layer as the covering structure. The following two embodiments are described separately.

One possible embodiment is to implement the covering structure by the flexible circuit board and its associated film layer extending into the spacing region.

In the embodiment of the present disclosure, the flexible circuit board and its associated film layer includes a conductive adhesive and a filling layer.

The conductive adhesive is disposed between the flexible circuit board 30 and the touch layer 15 and arranged in the bonding region 12 for bonding the flexible circuit board and the touch layer. The filling layer is disposed on a side, distal from the display substrate 14, of the flexible circuit board 30 in the bonding region 12 for filling the height difference (segment difference) between the surface of the flexible circuit board and the surface of the polarizer layer.

Exemplarily, the conductive adhesive is an anisotropic conductive film (ACF), which is a bonded layer containing conductive particles. Under high temperature and pressure, the conductive adhesive breaks down to expose conductive particles, which conduct the flexible circuit board and the display substrate and electrically connect the flexible circuit board and the display substrate when energized. The filling layer is a Space Film (SF), such as plastic, foam, and other materials made of film.

Figure 6:
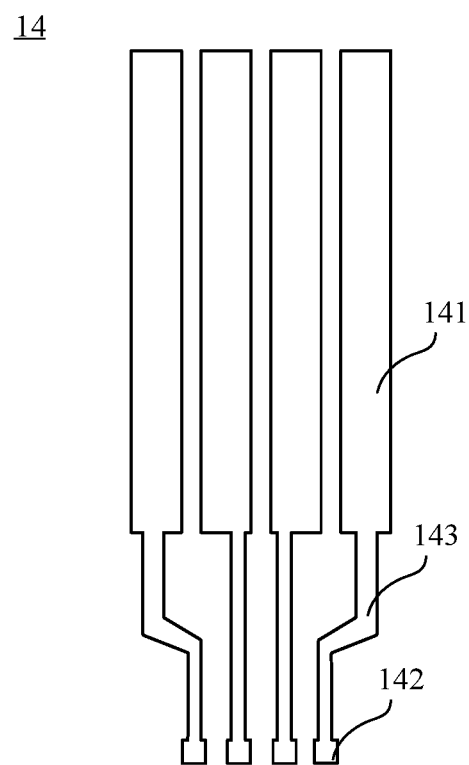
FIG. 6 is a schematic diagram of a structure of a touch layer according to some embodiments of the present disclosure.

FIG. 6 is a schematic diagram of a structure of a touch layer according to some embodiments of the present disclosure. The touch layer 15 includes a touch electrode 141, a pad 142, and a signal line 143 connecting the touch electrode 141 and the pad 142.

The touch electrode 141 is arranged in the display region 11. The pad 142 is arranged in the bonding region 12 and bonded to the flexible circuit board 30 by the conductive adhesive 60. The signal line 143 is at least partially arranged in the spacing region 13 and is covered by the protective structure 40.

It should be noted that the touch electrode 141 shown in FIG. 6 is a strip electrode, and the touch electrode 141 may also be other shapes in other embodiments, such as a block electrode, etc. In addition, the quantity of the touch electrodes, the signal lines and the pads in the figure are only examples and are not limitations of the present disclosure.

In the embodiment of the present disclosure, the covering structure 42 is integrally formed with at least one of the flexible circuit board 30, the conductive adhesive 60, and the filling layer 70. In the embodiment of the present disclosure, the covering structure 42 is a portion of at least one of the flexible circuit board 30, the conductive adhesive 60, and the filling layer 70 that extends from the bonding region 12 to the spacing region 13 during manufacture.

Some exemplary structures of the overlay structure 42 are described below in conjunction with the accompanying FIGS. 7 to 10.

Exemplarily, the covering structure 42 is integrally formed with the conductive adhesive 60, i.e., the covering structure 42 is a portion of the conductive adhesive 60 extending from the bonding region 12 to the spacing region 13. The following is illustrated in conjunction with FIGS. 7 and 8.

Figure 7:
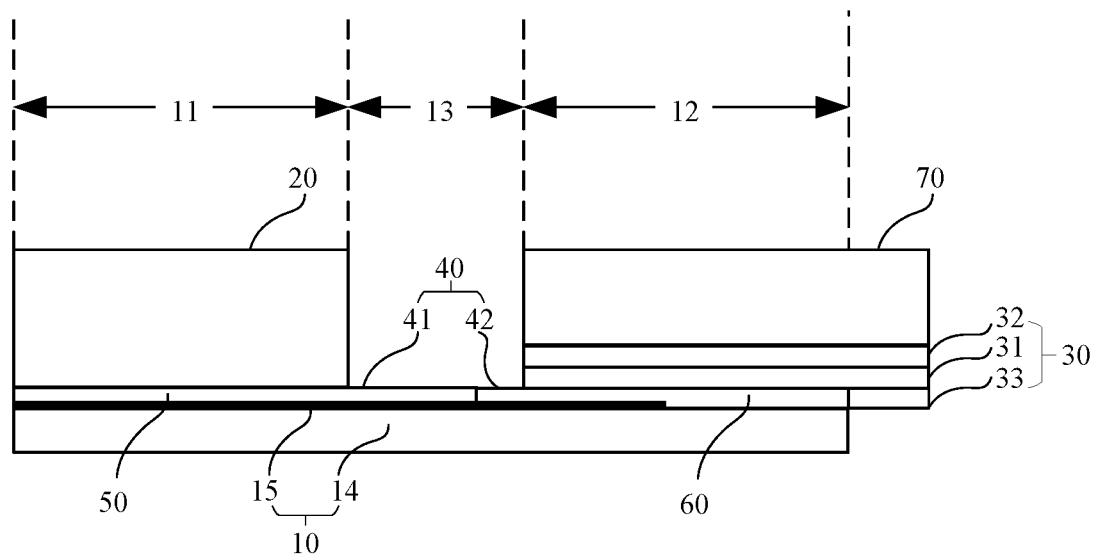
FIG. 7 is a schematic diagram of a structure of a display panel according to some embodiments of the present disclosure.

FIG. 7 is a schematic diagram of a structure of a display panel according to some embodiments of the present disclosure. Referring to FIG. 7, the conductive adhesive 60 extends from the bonding region 12 to the spacing region 13, and side edges of the conductive adhesive 60 are in contact with side edges of the adhesive structure 41 in the spacing region 13, such that the touch layer in the spacing region is completely covered.

Figure 8:
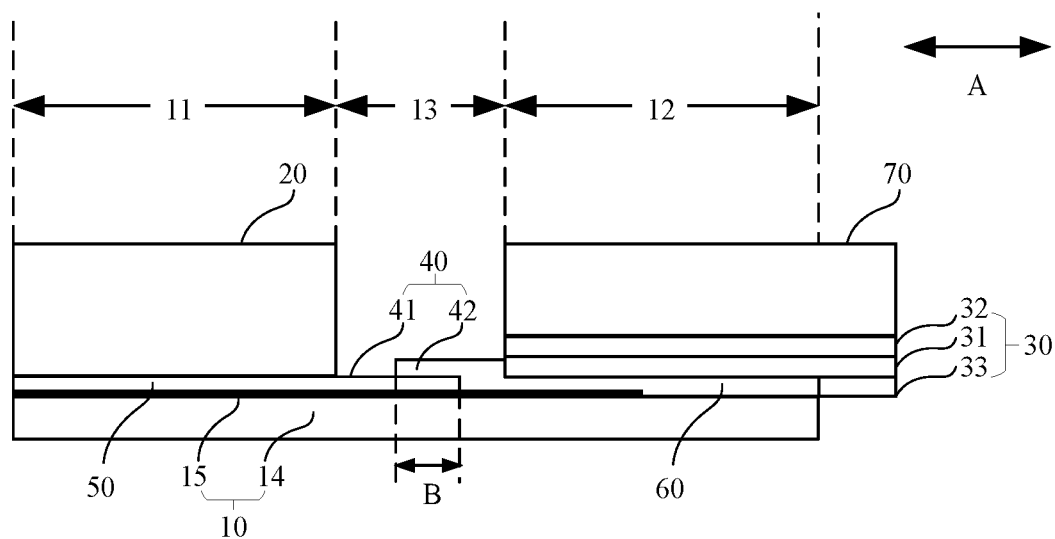
FIG. 8 is a schematic diagram of a structure of a display panel according to some embodiments of the present disclosure.

FIG. 8 is a schematic diagram of the structure of a display panel according to some embodiments of the present disclosure. Referring to FIG. 8, the conductive adhesive 60 extends from the bonding region 12 to the spacing region 13. FIG. 8 differs from FIG. 7 only in that a portion of the conductive adhesive 60 is stacked on the adhesive structure 41, such that the touch layer in the spacing region is completely covered.

In the embodiment shown in FIG. 8, a width B of an overlapped portion between the conductive adhesive 60 and the adhesive structure 41 in a first direction A that ranges from 50 nm to 100 nm.

The first direction is an arrangement direction of the display region 11, the spacing region 13 and the bonding region 12.

For example, the width B is 50 nm.

In the implementation, the conductive adhesive is extended to the spacing region to cover the touch layer in the spacing region, thereby avoiding exposure of the touch layer to corrosion. The conductive adhesive is applied to achieve the above function. On the one hand, it is easy to produce the conductive adhesive. A portion of the conductive adhesive covers the portion of the touch layer in the bonding region, and the portion of the conductive adhesive refers to the portion configured to connect the touch layer and the flexible circuit board, and the portion of the conductive adhesive is arranged in the bonding region and adjacent to the spacing region. In both directions parallel and perpendicular to the surface of the touch layer, the distance between the conductive adhesive and the touch layer arranged in the spacing region that needs to be covered is closer, and it is more convenient for the conductive adhesive to extend to the touch layer in the spacing region during manufacture. On the other hand, the conductive adhesive has good adhesion, in the case that the touch layer is covered, the conductive adhesive can completely seal the touch layer, and can lap with the adhesive structure arranged in the spacing region, so as to completely seal the touch layer.

In other embodiments, the conductive adhesive 60 may also be disposed only in the bonding region 12 and does not extend into the spacing region 13. In this case, covering the touch layer is achieved by at least one of the flexible circuit board and the filling layer.

Exemplarily, the covering structure 42 is integrally formed with the flexible circuit board 30, i.e., the covering structure 42 is the portion of the flexible circuit board 30 extending from the bonding region 12 to the spacing region 13. This is illustrated below in conjunction with FIG. 9.

Figure 9:
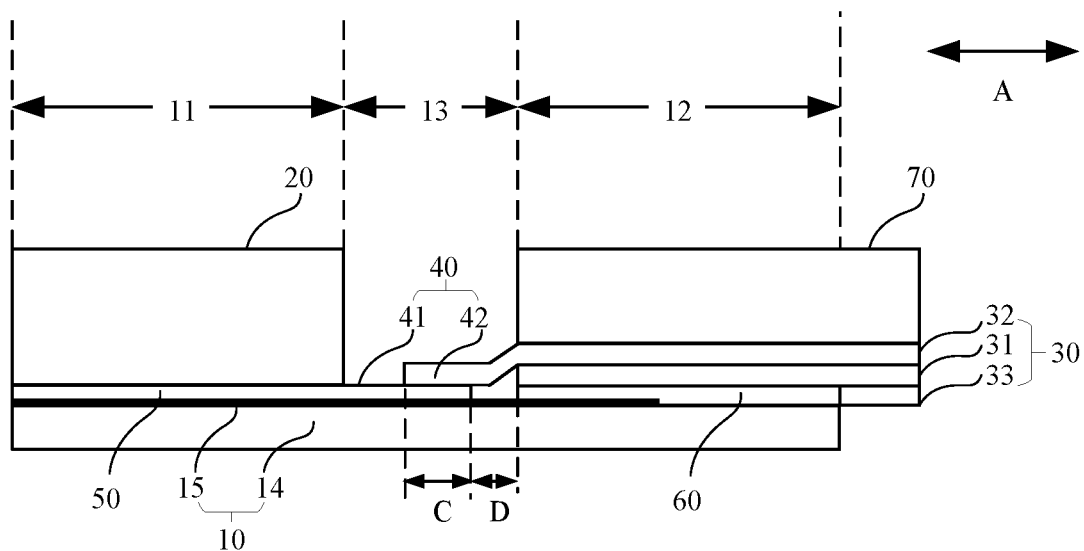
FIG. 9 is a schematic diagram of a structure of a display panel according to some embodiments of the present disclosure.

FIG. 9 is a schematic diagram of a structure of a display panel according to some embodiments of the present disclosure. Referring to FIG. 9, the flexible circuit board 30 includes a metal layer 31 and an insulating film layer 32 disposed between the metal layer 31 and the filling layer, the metal layer 31 is bonded to the pad 142 of the touch layer 15 in the bonding region 12, the insulating film layer 32 extends from the bonding region 12 to the spacing region 13, the covering structure 42 is integrally formed with the insulating film layer 32, and a portion of the insulating film layer 32 is stacked on the adhesive structure 41, such that the touch layer in the spacing region is completely covered.

In the embodiment shown in FIG. 9, a width C of an overlapped portion between the insulating film layer 32 and the adhesive structure 41 in a first direction A ranges from 50 nm to 100 nm.

For example, the width C is 50 nm.

In the embodiment shown in FIG. 9, a spacing D between the metal layer 31 and the adhesive structure 41 in the first direction A ranges from 50 nm to 100 nm.

For example, the spacing D is 50 nm.

Referring to FIG. 9, the TFPC 30 further includes an ink layer 33. The ink layer 33 is disposed on a side, backing the insulating film layer 32, of the metal layer 31, and the ink layer 33 is disposed outside of the touch screen 10. By using the ink layer 33 to cover the other side of the metal layer, the bending performance of the TFPC is increased.

For example, the metal layer 31 is a copper (Cu) metal layer.

For example, the insulating film layer 32 is a polyimide film (PI) layer.

For example, the covering structure 42 is integrally formed with the filling layer 70, i.e., the covering structure 42 is a portion of the filling layer 70 extending from the bonding region 12 to the spacing region 13. This is illustrated below in conjunction with FIG. 10.

Figure 10:
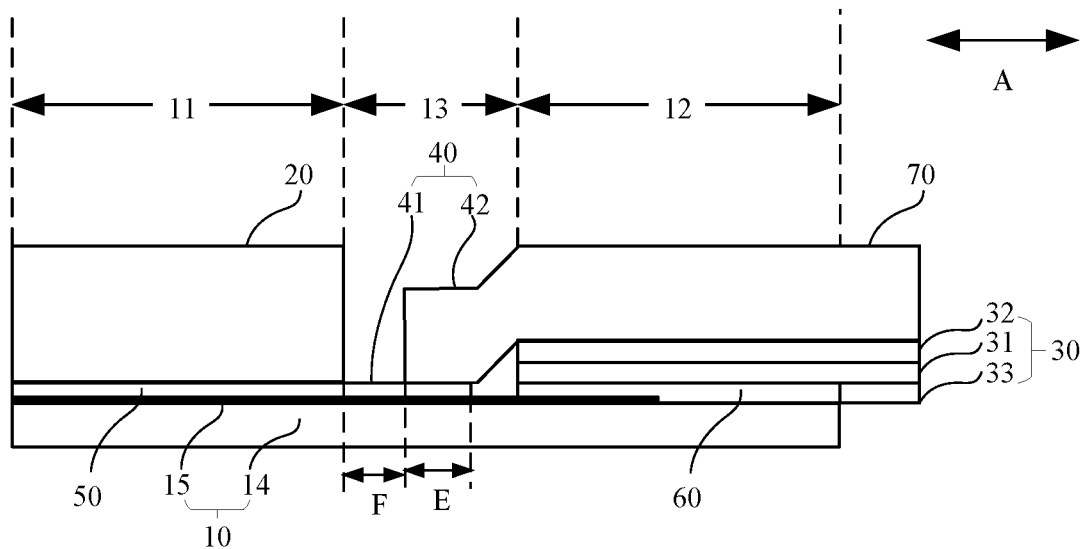
FIG. 10 is a schematic diagram of a structure of a display panel according to some embodiments of the present disclosure.

FIG. 10 is a schematic diagram of a structure of a display panel according to some embodiments of the present disclosure. Referring to FIG. 10, the filling layer 70 extends from the bonding region 12 to the spacing region 13, and a portion of the filling layer 70 is stacked on the adhesive structure 41, such that the touch layer in the spacing region is completely covered.

In the embodiment shown in FIG. 10, a width E of an overlapped portion between the filling layer 70 and the adhesive structure 41 in the first direction A ranges from 50 nm to 100 nm.

For example, the width E is 50 nm.

In the embodiment shown in FIG. 10, a width F of an overlapped portion between the filling layer 70 and the polarizer layer 20 in the first direction A ranges from 50 nm to 100 nm. For example, the width F is 100 nm.

The foregoing FIGS. 7 to 10 illustrate that covering the touch layer is achieved by a single film layer. In other embodiments, a plurality of film layers may be applied to achieve covering the touch layer simultaneously. Some additional exemplary structures of the covering structure 42 are illustrated below in conjunction with the accompanying FIGS. 11 to 14.

Figure 11:
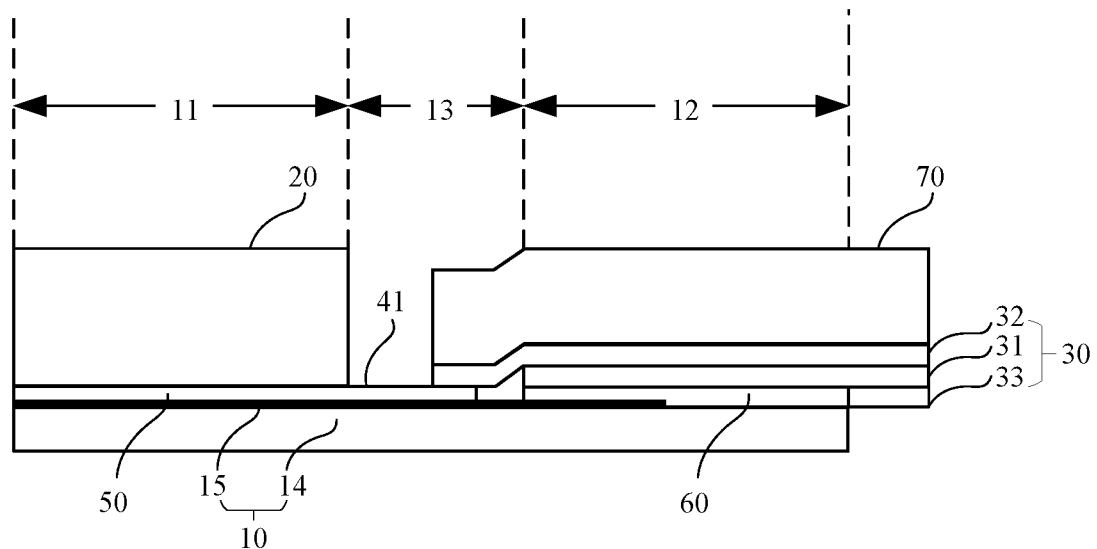
FIG. 11 is a schematic diagram of a structure of a display panel according to some embodiments of the present disclosure.

FIG. 11 is a schematic diagram of a structure of a display panel according to some embodiments of the present disclosure. Referring to FIG. 11, the insulating film layer 32 and the filling layer 70 of the flexible circuit board 30 extend simultaneously into the spacing region 13 to cover the touch layer in the spacing region.

Figure 12:
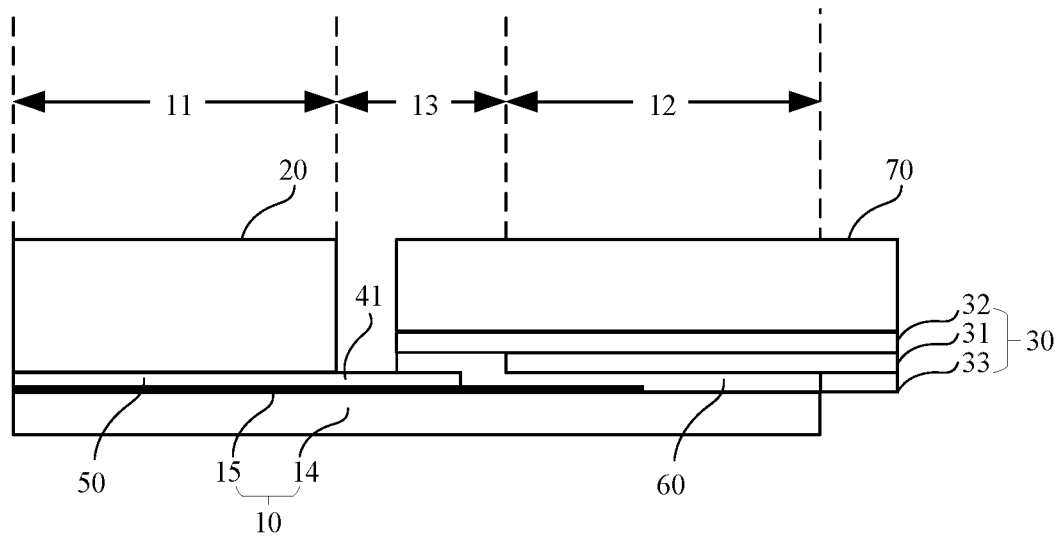
FIG. 12 is a schematic diagram of a structure of a display panel according to some embodiments of the present disclosure.

FIG. 12 is a schematic diagram of a structure of a display panel according to some embodiments of the present disclosure. Referring to FIG. 12, the conductive adhesive 60, the insulating film layer 32 of the flexible circuit board 30, and the filling layer 70 extend simultaneously into the spacing region 13 to cover the touch layer in the spacing region.

For example, the width of the conductive adhesive 60, the insulating film layer 32 and the filling layer 70 in the first direction in the spacing region is 100 nm.

Figure 13:
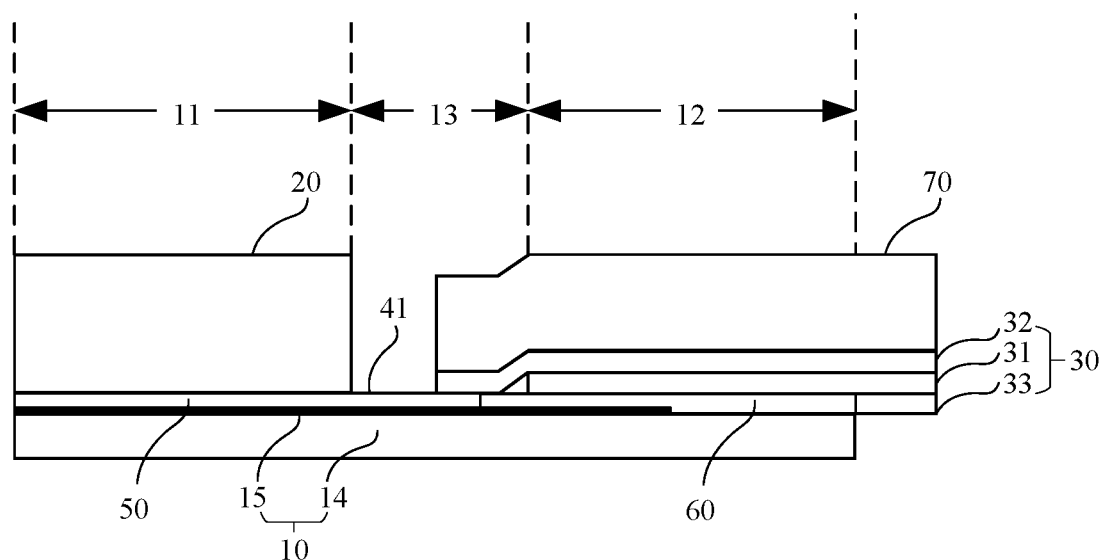
FIG. 13 is a schematic diagram of a structure of a display panel according to some embodiments of the present disclosure.

FIG. 13 is a schematic diagram of a structure of a display panel according to some embodiments of the present disclosure. Referring to FIG. 13, the conductive adhesive 60, the insulating film layer 32 and the filling layer 70 of the flexible circuit board 30 extend simultaneously to the spacing region 13, FIG. 13 differs from FIG. 12 only in that the conductive adhesive 60 in FIG. 13 does not cover the adhesive structure 41 to cover the touch layer of the spacing region on the adhesive structure 41, but merely attaches to the side edge of the adhesive structure 41.

Figure 14:
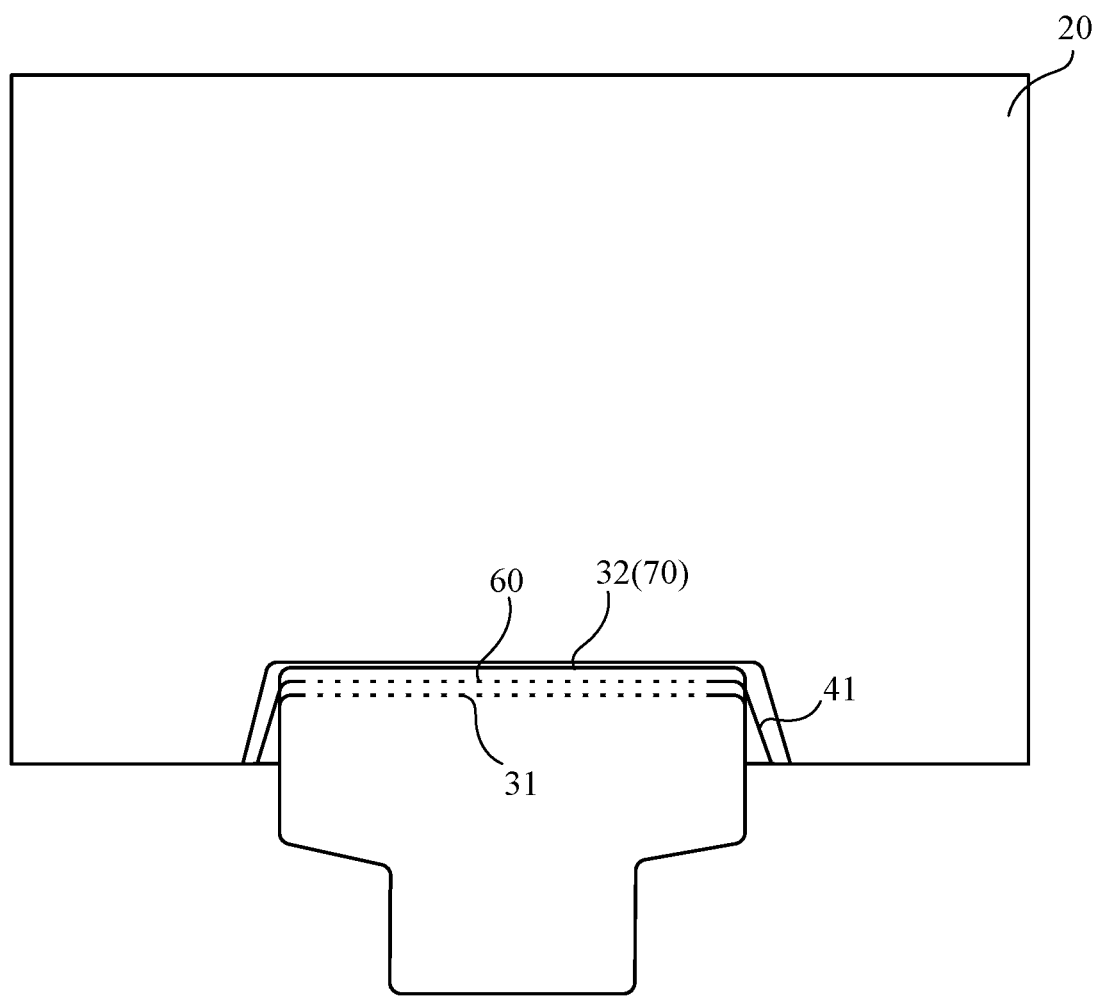
FIG. 14 is a top view of a display panel according to some embodiments of the present disclosure.

FIG. 14 is a top view of the display panel shown in FIG. 13. Referring to FIG. 14, the boundary of the adhesive structure 41 is overlapped with the boundary of the conductive adhesive 60, and the insulating film layer 32, the filling layer 70 and the adhesive structure 41 have an overlapped region, i.e., the insulating film layer 32 and the filling layer 70 extend onto the adhesive structure 41 simultaneously.

For example, in the first direction, the width of the conductive adhesive 60 in the spacing region 13 is 50 nm, and the width of the insulating film layer 32 and the filling layer 70 in the spacing region is 100 nm.

In the solution shown in FIG. 12 and FIG. 13, three film layers are applied to cover the originally exposed touch layer in the spacing region, forming multiple seals, such that a fully closed design of the touch layer is achieved, and the corrosion of the touch layer by iodine and water vapor is avoided. Because the adhesion accuracy of the conductive adhesive is less than the bonding accuracy of the flexible circuit board, in the case that errors appears in the adhesion process of the conductive adhesive and fails to completely cover the touch layer according to the theoretical design, the sealing of the touch layer can still be ensured by the upper layer of the flexible circuit board and the filling layer.

The insulating film layer is transparent, light and free of corrosive elements. The filling layer 70 has a larger thickness, not only providing a seal, but also providing a downward pressure on the insulating film layer to make it adhere to the adhesive structure due to its own weight.

In addition, the filling layer 70 can protect the spacing region from the appearance of physical damage in the region caused by the impact of external forces.

Another possible embodiment is to form a layer on top of the flexible circuit board and its associated film layer as a covering structure.

Figure 15:
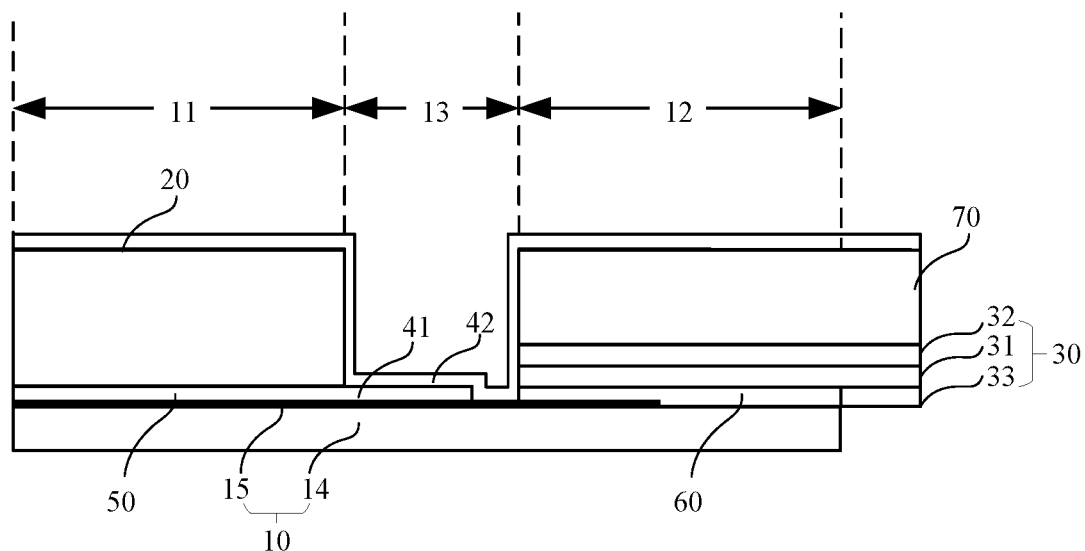
FIG. 15 is a schematic diagram of a structure of a display panel according to some embodiments of the present disclosure.

FIG. 15 is a schematic diagram of a structure of a display panel according to some embodiments of the present disclosure. Referring to FIG. 15, both the insulating film layer 32 and the filling layer 70 of the flexible circuit board 30 do not extend to the spacing region 13, and have a covering structure 42 on the filling layer 70 and the polarizer layer 20, which extends to the spacing region 13 to cover the touch layer in the spacing region.

For example, the covering structure is made of an organic or inorganic transparent material.

It can be seen that the first solution has fewer processes compared to the second solution, and the signal line short circuit problem of the touch layer in the related are can be solved without adding new materials and new processes, and the thickness of the whole display panel is smaller, which is conducive to the thinness of the display panel.

In the embodiment of the present disclosure, the display panel further includes a transparent cover disposed on the polarizer layer and the filling layer, which is configured to realize the encapsulation of the display panel. Typically, the transparent cover is a glass cover.

Embodiments of the present disclosure further provide a display device. The display device includes any one of the above display panel and a power supply assembly. The power supply assembly is configured to supply power to the display panel.

Figure 16:
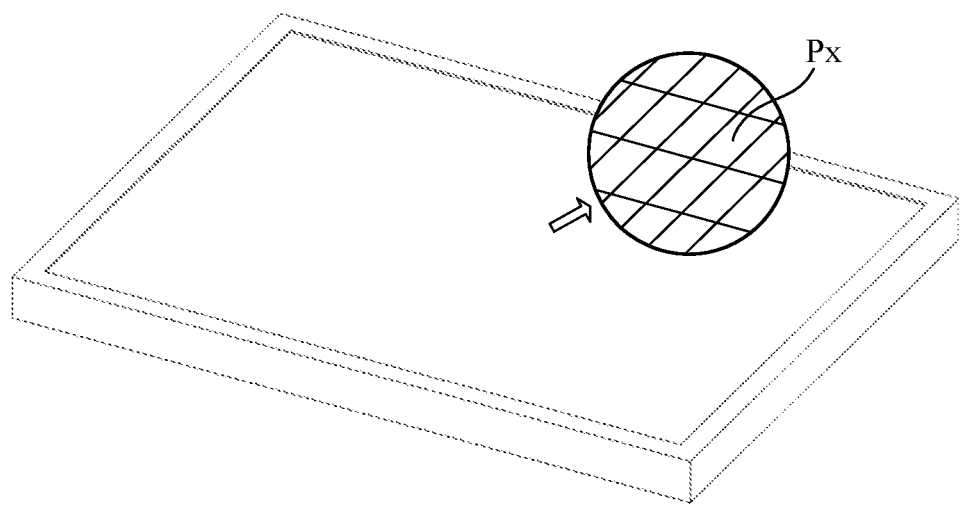
FIG. 16 is a schematic diagram of a structure of a display device according to some embodiments of the present disclosure.

The display device in embodiments of the present disclosure may be a cell phone, a tablet computer, a television, a monitor, a laptop computer, a digital camera, a navigator, a wearable device, and any other product or component having a display function. For example. FIG. 16 is a schematic diagram of a structure of a display device according to some embodiments of the present disclosure. The display device includes any of the above display panels. The display region of the display panel includes sub-pixel region Px arranged in rows and columns. Each of the data lines in the display region may be between two adjacent columns of sub-pixel region Px to transmit the accessed data signal or test signal into each sub-pixel region Px.

In the embodiment of the present disclosure, the touch layer is covered by forming a polarizer layer in the display region, the touch layer is covered by forming a flexible circuit board in the bonding region, and the touch layer is covered by disposing a protective structure in the spacing region, thereby making the entire touch layer do not have an exposed portion, avoiding the iodine and the water vapor in the polarizer layer from corroding the exposed touch layer, solving the problem of short circuiting the signal lines of the touch layer, and improving the stability of the display panel.

Figure 17:
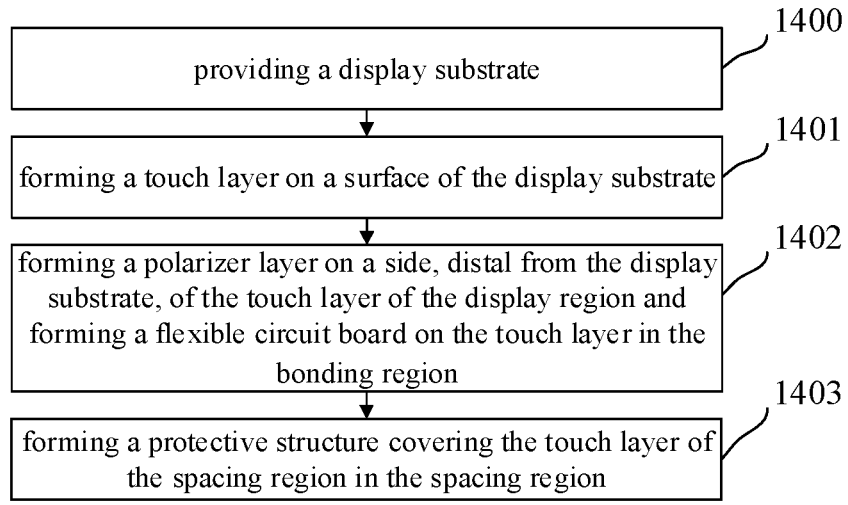
FIG. 17 is a flowchart of a method for manufacturing a display panel according to some embodiments of the present disclosure.

FIG. 17 is a flowchart of a method for manufacturing a display panel according to some embodiments of the present disclosure. Referring to FIG. 17, the method includes the follows.

In 1400, a display substrate is provided, wherein the display substrate includes a display region, a bonding region, and a spacing region disposed between the display region and the bonding region.

In 1401, a touch layer is formed on a surface of the display substrate, wherein the touch layer is contiguously arranged in the display region, the spacing region and at least part of the bonding region.

In 1402, a polarizer layer is formed on a side, distal from the display substrate, of the touch layer of the display region and a flexible circuit board is formed on the touch layer in the bonding region.

For example, the polarizer layer is attached to the side, distal from the display substrate, of the touch layer of the display region.

In 1403, a protective structure is formed, and the protective structure covers p.

The processes 1402 and 1403 may not have sequential relationship, i.e., processes 1403 and 1402 are performed simultaneously. Or there is a sequential relationship between processes 1403 and 1402. i.e., process 1403 proceeds upon process 1402.

In the embodiments of the present disclosure, the touch layer is covered in the display region by forming a polarizer layer, the touch layer is covered in the bonding region by forming a flexible circuit board, and the touch layer is covered in the spacing region by arranging a protective structure, such that the entire touch layer does not have an exposed portion, avoiding corrosion of the exposed touch layer by iodine and water vapor in the polarizer layer, solving the problem of short circuiting of signal lines in the touch layer, and improving the stability of the display panel.

In some possible embodiments, the protective structure includes an adhesive structure and a covering structure, and forming the protective structure covering the touch layer of the spacing region in the spacing region includes follows.

An integrally formed adhesive layer and adhesive structure are formed on the touch layer prior to forming the polarizer layer. The adhesive layer is configured to protect the touch layer and make the polarizer layer attach to the touch screen.

A covering structure is formed on the touch layer not covered by the adhesive structure in the spacing region.

For example, forming the covering structure on the touch layer not covered by the adhesive structure in the spacing region includes: forming a conductive adhesive layer on the touch layer in the bonding region prior to forming the flexible circuit board: forming a filling layer on the flexible circuit board in the bonding region upon forming the flexible circuit board; and forming a covering structure integrally formed with at least one of the flexible circuit board, the conductive adhesive and the filling layer in response to forming at least one layer of the flexible circuit board, the conductive adhesive and the filling layer.

In the implementation, the covering structure is realized by the flexible circuit board and the associated film layer. In the case that the flexible circuit board and the associated film layer is formed, the flexible circuit board and the associated film layer extend from the bonding region to the spacing region. In this way, a part of the spacing region having the function of covering the touch layer, that is, the above covering structure The following is a detailed description of the method of manufacturing a display panel taking the process of manufacturing a display panel shown in FIG. 13 as an example.

Figure 18:
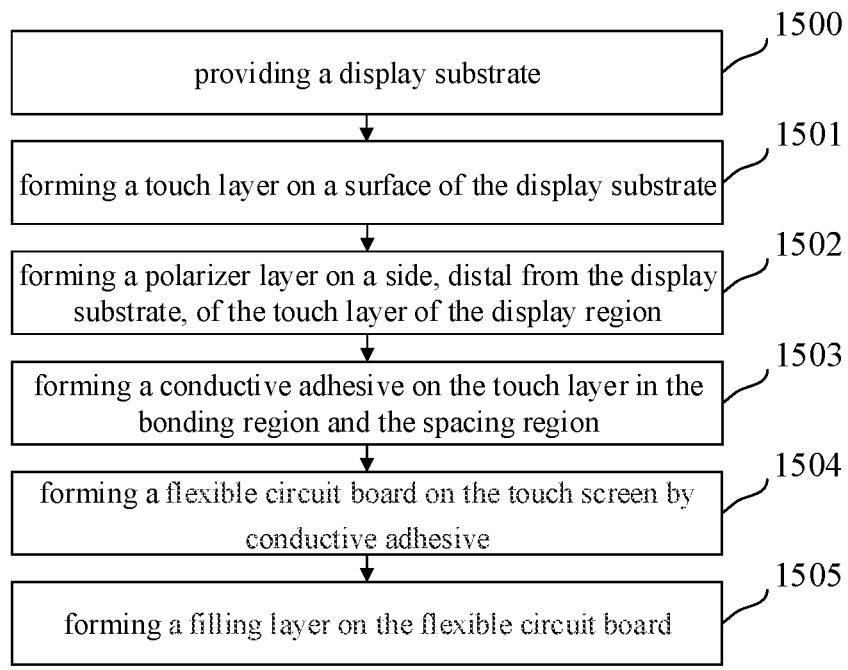
FIG. 18 is a flowchart of a method for manufacturing a display panel according to some embodiments of the present disclosure.

FIG. 18 is a flowchart of a method for manufacturing a display panel according to some embodiments of the present disclosure. Referring to FIG. 18, the method includes the follows.

In 1500, a display substrate is provided, wherein the display substrate includes a display region, a bonding region, and a spacing region disposed between the display region and the bonding region.

In 1501, a touch layer is formed on a surface of the display substrate, wherein the touch layer is contiguously arranged in the display region, the spacing region and at least part of the bonding region.

The display substrate and the touch layer disposed on the surface of the display substrate form a touch screen.

In 1502, a polarizer layer is formed on a side, distal from the display substrate, of the touch layer of the display region.

Figure 19:
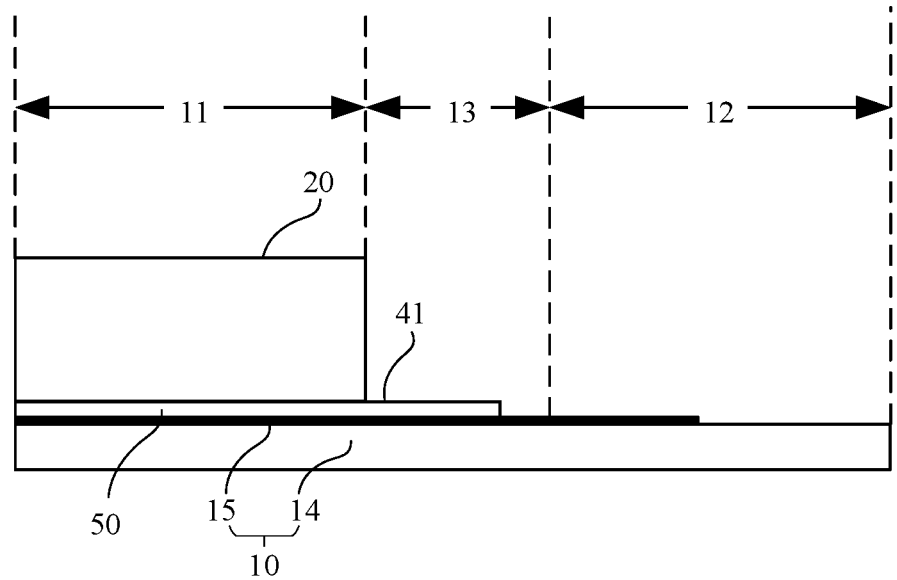
FIG. 19 is a schematic diagram of a structure of a display panel in the process of manufacturing the display panel according to some embodiments of the present disclosure.

As shown in FIG. 19, the adhesive layer 50 is applied to the touch layer 15, and the polarizer layer 20 is attached to the adhesive layer 50. A portion of the adhesive layer 50 extends from the display region 11 into the spacing region 13, i.e., the adhesive structure 41.

It should be noted that the adhesive layer 50 is difficult to only cover the display region 11 without covering the spacing region 13, nor the entire spacing region 13, due to process accuracy limitations in the that the adhesive layer 50 is applied to the touch layer 15.

In 1503, a conductive adhesive is formed on the touch layer in the bonding region and the spacing region.

Figure 20:
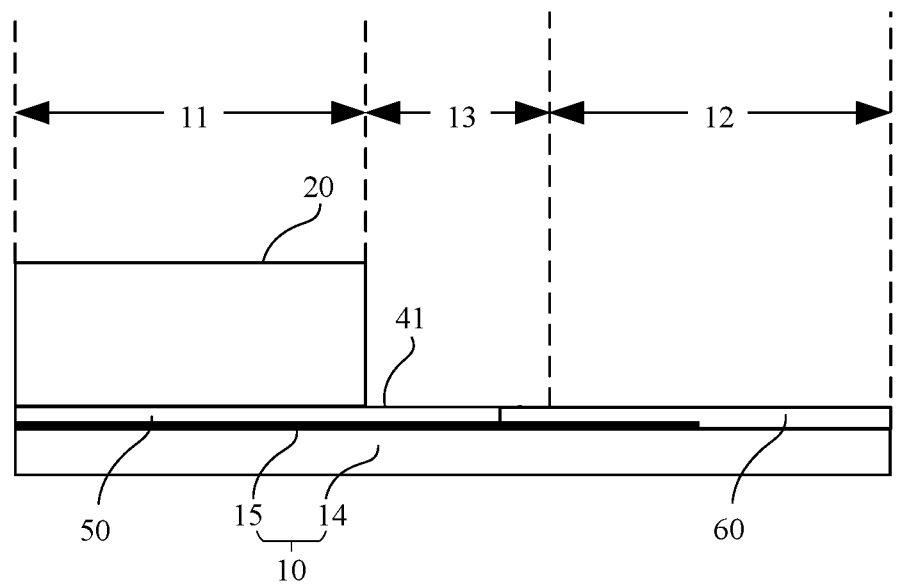
FIG. 20 is a schematic diagram of a structure of a display panel in the process of manufacturing the display panel according to some embodiments of the present disclosure.

As shown in FIG. 20, a conductive adhesive 60 is attached to the touch layer 15 in the bonding region 12 and the spacing region 13. The conductive adhesive covers the bonding region 12 and the spacing region 13, and the side edges of the conductive adhesive 60 contact the side edges of said adhesive structure 41 in the spacing region 13. The portion of the conductive adhesive 60 arranged in the spacing region 13 is a portion of the covering structure.

In 1504, a flexible circuit board is formed on the touch screen by conductive adhesive.

Figure 21:
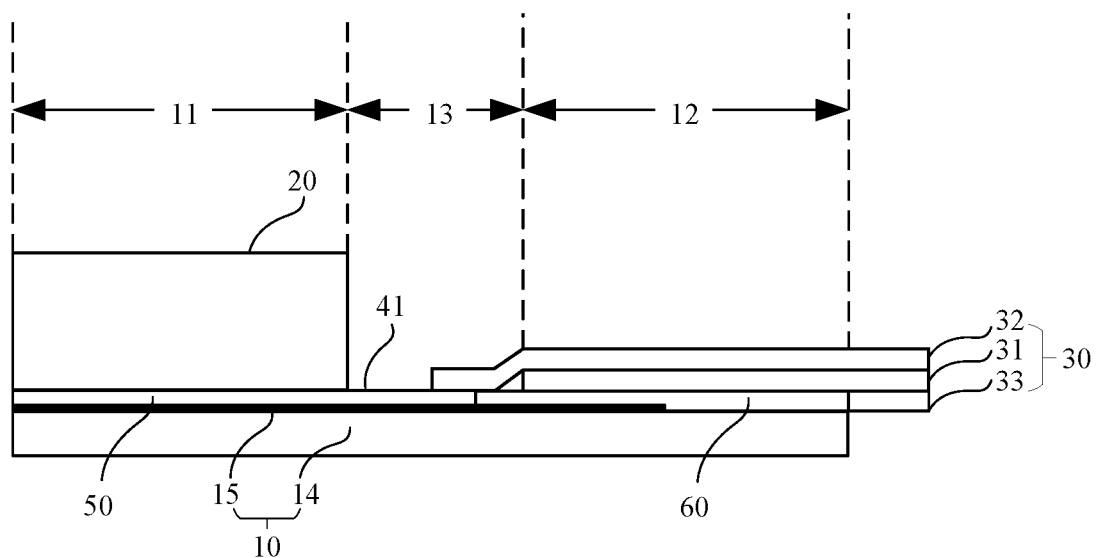
FIG. 21 is a schematic diagram of a structure of a display panel in the process of manufacturing the display panel according to some embodiments of the present disclosure.

As shown in FIG. 21, a flexible circuit board 30 is bonded on the touch screen by a conductive adhesive 60, the flexible circuit board 30 includes a metal layer 31 and an insulating film layer 32 disposed between the metal layer 31 and the filling layer, the metal layer 31 is bonded to the pad 142 of the touch layer 15 in the bonding region 12, the insulating film layer 32 extends from the bonding region 12 to the spacing region 13, the covering structure 42 is integrally formed with the insulating film layer 32, and a portion of the insulating film layer 32 is stacked on the adhesive structure 41, such that the touch layer in the spacing region is completely covered.

In 1505, a filling layer is formed on the flexible circuit board.

As shown in FIG. 13, a filling layer 70 is attached to the flexible circuit board 30. The filling layer 70 extends from the bonding region 12 to the spacing region 13, and a portion of the filling layer 70 is stacked on the adhesive structure 41, such that the touch layer in the spacing region is completely covered. The portion of the filling layer 70 in the spacing region 13 belongs to the covering structure.

For example, in the first direction, the width of the conductive adhesive 60 in the spacing region 13 is 50 nm, and the width of the insulating film layer 32 and the filling layer 70 in the spacing region is 100 nm.

In the above method for manufacturing the display panel according to the embodiments of the present disclosure, three film layers are applied to cover the originally exposed touch layer in the spacing region, forming multiple seals, such that a fully closed design of the touch layer is achieved, and the corrosion of the touch layer by iodine and water vapor is avoided. Because the adhesion accuracy of the conductive adhesive is less than the bonding accuracy of the flexible circuit board, in the case that errors appears in the adhesion process of the conductive adhesive and fails to completely cover the touch layer according to the theoretical design, the sealing of the touch layer can still be ensured by the upper layer of the flexible circuit board and the filling layer.

The insulating film layer is transparent, light and free of corrosive elements. The filling layer 70 has a larger thickness, not only providing a seal, but also providing a downward pressure on the insulating film layer to make it adhere to the adhesive structure due to its own weight.

In addition, the filling layer 70 can protect the spacing region from the appearance of physical damage in the region caused by the impact of external forces.

The above is only an optional embodiment of the present disclosure and is not intended to limit the present disclosure. Any modification, equivalent replacement, improvement, etc. made within the spirit and principles of the present disclosure shall be included in the scope of protection of the present disclosure.

What is claimed is:

1. A display panel, comprising:
  a display substrate, comprising a display region, a bonding region, and a spacing region disposed between the display region and the bonding region;
  a touch layer, disposed on a surface of the display substrate and contiguously arranged in the display region, the spacing region, and at least part of the bonding region;
  a polarizer layer, disposed on a side, distal from the display substrate, of the touch layer and arranged in the display region;
  a flexible circuit board, connected to the touch layer in the bonding region, wherein the flexible circuit board and the polarizer layer are disposed on one surface of the touch layer;
  a filling layer, disposed on a side, distal from the display substrate, of the flexible circuit board in the bonding region;
  an adhesive layer, disposed between the polarizer layer and the touch layer; and
  a protective structure, covering the touch layer in the spacing region, wherein the protective structure comprises:
    an adhesive structure, integrally formed with the adhesive layer; and
    a covering structure, covering the touch layer in the spacing region not covered by the adhesive structure, the adhesive structure, the polarizer layer, and the filling layer wherein the covering structure is made of transparent material.

2. The display panel according to claim 1, further comprising:
  a conductive adhesive, disposed between the flexible circuit board and the touch layer and arranged in the bonding region;
  wherein the covering structure is integrally formed with at least one of the flexible circuit board, the conductive adhesive, and the filling layer.

3. The display panel according to claim 2, wherein the touch layer comprises:
  a touch electrode, arranged in the display region;
  a pad, arranged in the bonding region and bonded to the flexible circuit board by the conductive adhesive; and
  a signal line, at least partially arranged in the spacing region to connect the touch electrode and the pad, wherein the signal line in the spacing region is covered by the protective structure.

4. The display panel according to claim 2, wherein the conductive adhesive extends from the bonding region to the spacing region, and the covering structure is integrally formed with the conductive adhesive; and
  side edges of the conductive adhesive are in contact with side edges of the adhesive structure in the spacing region, or a portion of the conductive adhesive is stacked on the adhesive structure.

5. The display panel according to claim 4, wherein a width of an overlapped portion between the conductive adhesive and the adhesive structure in a first direction ranges from 50 nm to 100 nm;
  wherein the first direction is an arrangement direction of the display region, the spacing region, and the bonding region.

6. The display panel according to claim 3, wherein the flexible circuit board comprises a metal layer and an insulating film layer disposed between the metal layer and the filling layer; wherein the metal layer is bonded to the pad of the touch layer in the bonding region, the insulating film layer extends from the bonding region to the spacing region, the covering structure is integrally formed with the insulating film layer, and a portion of the insulating film layer is stacked on the adhesive structure.

7. The display panel according to claim 6, wherein a width of an overlapped portion between the insulating film layer and the adhesive structure in a first direction ranges from 50 nm to 100 nm;
  wherein the first direction is an arrangement direction of the display region, the spacing region, and the bonding region.

8. The display panel according to claim 7, wherein a spacing between the metal layer and the adhesive structure in the first direction ranges from 50 nm to 100 nm.

9. The display panel according to claim 2, wherein the filling layer extends from the bonding region to the spacing region, the covering structure is integrally formed with the filling layer, and a portion of the filling layer is stacked on the adhesive structure.

10. The display panel according to claim 9, wherein a width of an overlapped portion between the filling layer and the adhesive structure in a first direction ranges from 50 nm to 100 nm;
  wherein the first direction is an arrangement direction of the display region, the spacing region, and the bonding region.

11. A display device, comprising: a display panel and a power supply assembly, wherein the power supply assembly is configured to supply power to the display panel, and the display panel comprises:
  a display substrate, comprising a display region, a bonding region, and a spacing region disposed between the display region and the bonding region;
  a touch layer, disposed on a surface of the display substrate and contiguously arranged in the display region, the spacing region, and at least part of the bonding region;
  a polarizer layer, disposed on a side, distal from the display substrate, of the touch layer and arranged in the display region;
  a flexible circuit board, connected to the touch layer in the bonding region, wherein the flexible circuit board and the polarizer layer are disposed on one surface of the touch layer;
  a filling layer, disposed on a side, distal from the display substrate, of the flexible circuit board in the bonding region;
  an adhesive layer, disposed between the polarizer layer and the touch layer; and
  a protective structure, covering the touch layer in the spacing region, wherein the protective structure comprises:
    an adhesive structure, integrally formed with the adhesive layer; and a covering structure, covering the touch layer in the spacing region not covered by the adhesive structure, the adhesive structure, the polarizer layer, and the filling layer, wherein the covering structure is made of transparent material.

12. A method for manufacturing a display panel, comprising:
providing a display substrate, wherein the display substrate comprises a display region, a bonding region, and a spacing region disposed between the display region and the bonding region;
forming a touch layer on a surface of the display substrate, wherein the touch layer is contiguously arranged in the display region, the spacing region, and at least part of the bonding region;
forming a polarizer layer on a side, distal from the display substrate, of the touch layer of the display region and forming a flexible circuit board on the touch layer in the bonding region;
forming a filling layer on the flexible circuit board in the bonding region; and
forming a protective structure covering the touch layer of the spacing region in the spacing region;
wherein the protective structure comprises an adhesive structure and a covering structure, and forming the protective structure covering the touch layer of the spacing region in the spacing region comprises:
forming an integrally formed adhesive layer and adhesive structure on the touch layer prior to forming the polarizer layer; and
forming a covering structure on the touch layer not covered by the adhesive structure in the spacing region, the adhesive structure, the polarizer layer, and the filling layer, wherein the covering structure is made of transparent material.

13. The method according to claim 12, wherein forming the covering structure on the touch layer not covered by the adhesive structure in the spacing region comprises:
forming a conductive adhesive layer on the touch layer in the bonding region prior to forming the flexible circuit board; and
forming a covering structure integrally formed with at least one of the flexible circuit board, the conductive adhesive, and the filling layer in response to forming at least one of the flexible circuit board, the conductive adhesive, and the filling layer.

14. The display device according to claim 11, wherein the display panel further comprises:
a conductive adhesive, disposed between the flexible circuit board and the touch layer and arranged in the bonding region;
wherein the covering structure is integrally formed with at least one of the flexible circuit board, the conductive adhesive, and the filling layer.

15. The display device according to claim 14, wherein the touch layer comprises:
a touch electrode, arranged in the display region;
a pad, arranged in the bonding region and bonded to the flexible circuit board by the conductive adhesive; and
a signal line, at least partially arranged in the spacing region to connect the touch electrode and the pad, wherein the signal line in the spacing region is covered by the protective structure.

16. The display device according to claim 14, wherein the conductive adhesive extends from the bonding region to the spacing region, and the covering structure is integrally formed with the conductive adhesive; and
side edges of the conductive adhesive are in contact with side edges of the adhesive structure in the spacing region, or a portion of the conductive adhesive is stacked on the adhesive structure.

17. The display device according to claim 14, wherein the filling layer extends from the bonding region to the spacing region, the covering structure is integrally formed with the filling layer, and a portion of the filling layer is stacked on the adhesive structure.

* * * * *